Aug. 29, 1967   L. GUILHAMAT   3,338,352
SELF-ADJUSTING BRAKE CYLINDER FOR AUTOMOTIVE VEHICLE
Filed June 10, 1965

Inventor
Louis Guilhamat
Stevens, Davis, Miller & Mosher
Attorneys

3,338,352
SELF-ADJUSTING BRAKE CYLINDER FOR AUTOMOTIVE VEHICLE
Louis Guilhamat, Lyon, France, assignor to Automobiles M. Berliet, Lyon, France, a French corporation
Filed June 10, 1965, Ser. No. 462,920
Claims priority, application France, July 16, 1964, 981,882, Patent 1,409,409
1 Claim. (Cl. 188—196)

ABSTRACT OF THE DISCLOSURE

A self-adjusting brake cylinder in which at least one piston moves along a rod and carries with it at least one rod gripping ring. A groove formed adjacent the end of the rod with the outer wall of the groove perpendicular to the axis of the rod and the inner wall frustoconical to limit the outward movement of the rings but not the return movement.

---

It is already known in brake cylinders of pressure-fluid braking systems to provide play take-up means having the function of compensating the return play of the piston or pistons during brake release.

These play take-up means are generally complicated or delicate, and operate irreversibly, thus requiring a special operation when replacing the worn brake linings. Besides they constitute an inconvenience in case of considerable brake overheating, notably in drum brakes, for the take up obtained in this case may lead to a maladjustment with the possibility of a residual braking effect when the brakes have resumed their normal temperature.

The present invention permits avoiding this inconvenience and to this end, in a brake cylinder comprising an automatic play take-up device incorporated in the cylinder comprising at least one piston slidably movable in said cylinder with a return play limited by said device, the invention is characterized primarily in that said piston is movable in relation to an inner rod mounted in said cylinder and having tightly fitted thereon a split spring ring disposed between two abutment faces formed on said piston with a play equal to said play, the friction set up between said ring and said rod being such that the ring may easily be carried along by the piston along said rod during a brake application, said ring resisting however the return effort exerted on the piston during the brake release movement by the elastic return means acting upon said brake.

Figure 1:
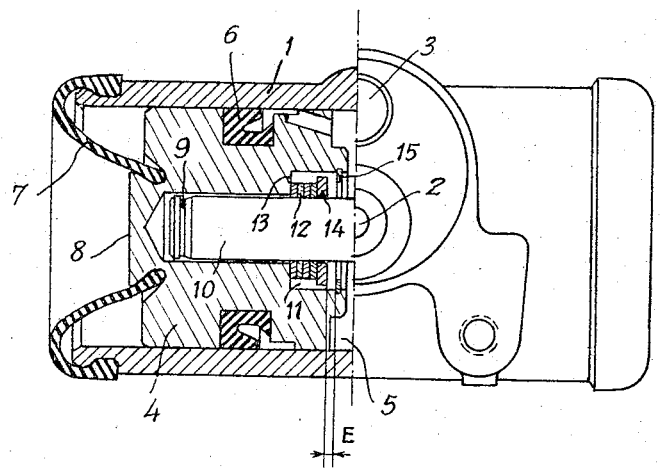
Figure 2:
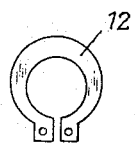

A typical form of embodiment of this self-adjusting brake cylinder is described hereinafter by way of example with reference to the attached drawing in which:

FIGURE 1 is a diagrammatic and fragmentary axial section showing the brake cylinder of this invention, and FIGURE 2 is a plane view of one of the spring rings of the play take-up device incorporated in this cylinder.

The brake cylinder illustrated comprises a cylinder body 1 of a type conventional notably in drum brakes; this cylinder body is provided intermediate its ends with a port 2 for delivering fluid under pressure to the cylinder and with another port 3 receiving a drain plug.

In this cylinder and at the two ends thereof a pair of pistons are slidably mounted; only one piston 4 is visible in FIGURE 1, the two pistons of the pair forming therebetween and with the cylinder wall a chamber 5 with which said ports communicate.

Each piston 4 is in sealed and sliding engagement with the cylinder wall by means of a packing 6, and is connected to the adjacent end of cylinder 1 by means of a protection cup 7, and the central portion 8 of its outer face constitutes a thrust face engageable by a brake shoe of conventional type (not shown).

The play take-up device incorporated in the brake cylinder comprises a rod 10 fitting freely in a corresponding cavity of piston 4, this rod being either rigid with the opposite piston or mounted therein in the same manner as in piston 4 illustrated in the figure, together, in this case, with all the component elements of the play take-up device which are disclosed hereinafter.

On the rod 10 and in a cavity 11 formed in the piston 4 a plurality of split spring rings or circlips 12, here four in number are fitted with a radial inward contraction.

These rings 12 may be of any suitable commercially available type and conventionally used as retaining or assembly members, such as the circlip rings known under the trademark "Truarc" and the trade name "Grip-Ring."

These rings 12 co-act in the axial direction at one end with a shoulder stop 13 forming the bottom of said cavity 11 and at the opposite end a washer 14 associated with these rings 12 is adapted to engage an abutment ring 15 resiliently fitted in a internal groove formed in said cavity 11.

In this example, the free mounting of the rod 10 in piston 4 is such that any undesired trapping of control fluid between the end of this rod and the bottom of said cavity is definitely precluded.

The axial play E of said rings 12 and washer 14 between the shoulder stop 13 and the abutment ring 15 corresponds to the permissible return play of piston 4 when the brake is released. This return movement is produced by the elastic return means associated with the brake (not shown) and the frictional effort due to the engagement between the rings 12 and rod 10 is calculated to be somewhat higher than this return effort; in other words, the rings 12 act as a piston stop during a brake release, whereby the inoperative position of the brake control means is that shown in FIGURE 1. On the other hand, this frictional effort obtained between said rings 12 and said rod 10 is definitely inferior to the effort likely to be applied by the fluid under pressure to the piston 4, and if for any reason the piston stroke E were not sufficient during a brake application, for example as a consequence of the gradual wearing of the brake linings, the piston 4 will easily carry along, through the medium of the abutment ring 15 and washer 14, the set of spring rings 12 which, in this case, will slide axially along the rod 10.

However, this movement of rings 12 is reversible in case of an effort exceeding that exerted by the elastic brake return means and may easily be produced without resorting to any particular operation in case of replacement of worn linings or, as already suggested hereinabove, when the brake cools down after a considerable overheating having determined a control movement tending to produce a residual braking effect on cooling.

Of course, the number of spring rings 12 depends on the nature of the ring or rings used in the brake cylinder and on the effort contemplated for returning the brake concerned to its release position, the ring or rings being in all cases such that the frictional engagement between these rings and the rod will generate the same mechanical frictional resistance in either direction.

On the other hand, if it is desired to limit the value of the permissible slipping stroke of the ring or rings 12 on said rod 10, a groove 9 will be formed in the outer end of this rod for engagement by the ring or the outermost ring if several rings 12 are provided. Advantageously the inner face of this groove 9 which is opposite to the ring will extend substantialy at right angles to the axis of rod 10, and the other inner face of the groove 9 will be substantially frustoconical or tapered, as shown; thus, the stopping action of this groove will be unidirectional, the ring having the possibility of escaping from this groove by slipping on said tapered side face.

Of course, in the more frequent case where the device comprises two pistons and two rings or sets of rings disposed symmetrically, this groove 9 is formed in both ends of the rod 10. Thus, the extreme movement of one or the other of these rings or sets of rings 12 along the rod 10 cannot take place except if for any reason an asymmetric condition developed in the operation of the device. Thus, the groove 9 will protect the device against possible damages.

What is claimed is:

A brake cylinder with built-in, self-adjustment means comprising at least one piston slidably and sealingly fitted in said cylinder with the return play thereof being limited by said adjustment means, a bore in said piston, two stops provided in said bore with a spacing equal to the aforesaid play, a rod disposed internally of said cylinder and extending into said bore, at least one split ring clamped on said rod between said stops, the frictional effort produced by the engagement between said ring and said rod being such that said ring may be easily moved along said rod by said piston during brake application but will resist the return effort exerted the brake return means on said piston during brake release, an annular groove adjacent the end of said rod along which said ring is adapted to slide, said groove having a width greater than the thickness of said ring, the side wall of said groove adjacent the end of the rod extending at right angles to the axis of the rod, the other wall of said groove being substantially of a frustoconical configuration with the smaller base being adjacent said flat side wall.

References Cited
UNITED STATES PATENTS

| 2,844,223 | 7/1958 | Runner | 188—72 X |
| 2,957,551 | 10/1960 | Nahodil | 188—196 X |
| 3,200,911 | 8/1965 | Rumelin | 188—196 |

FOREIGN PATENTS

| 76,776 | 10/1961 | France. |
| | | (1st addition to No. 1,227,387) |
| 937,781 | 9/1963 | Great Britain. |

DUANE A. REGER, *Primary Examiner.*